T. BÄNDER.
PHOTOGRAPHIC PLATE HOLDER.
APPLICATION FILED OCT. 26, 1911.
1,052,029.
Patented Feb. 4, 1913.
2 SHEETS—SHEET 1.
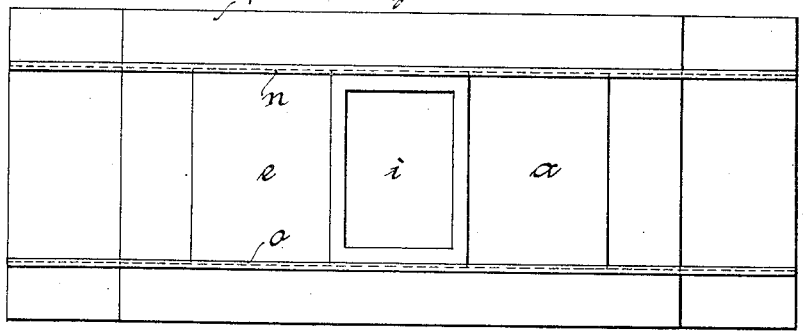
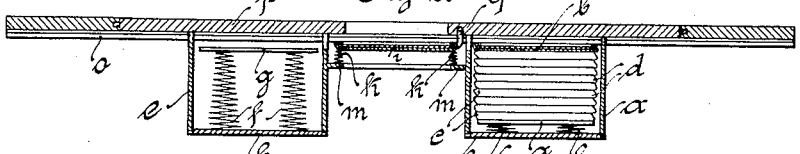
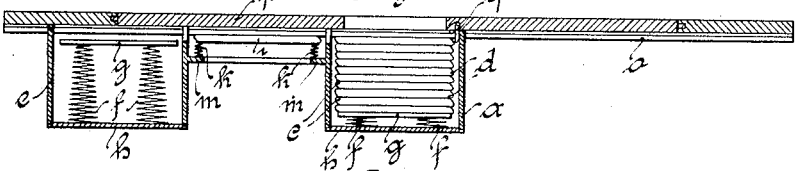
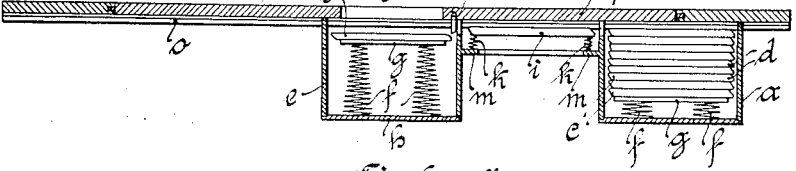
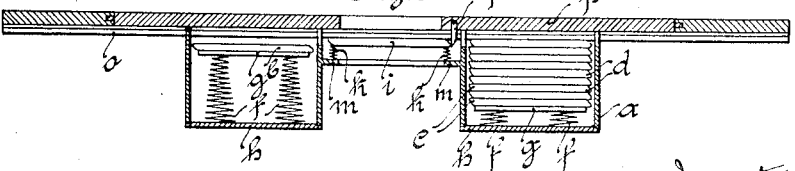
Witnesses:
Inventor:
Theodor Bänder
by Paul H. Schilling
Attorney

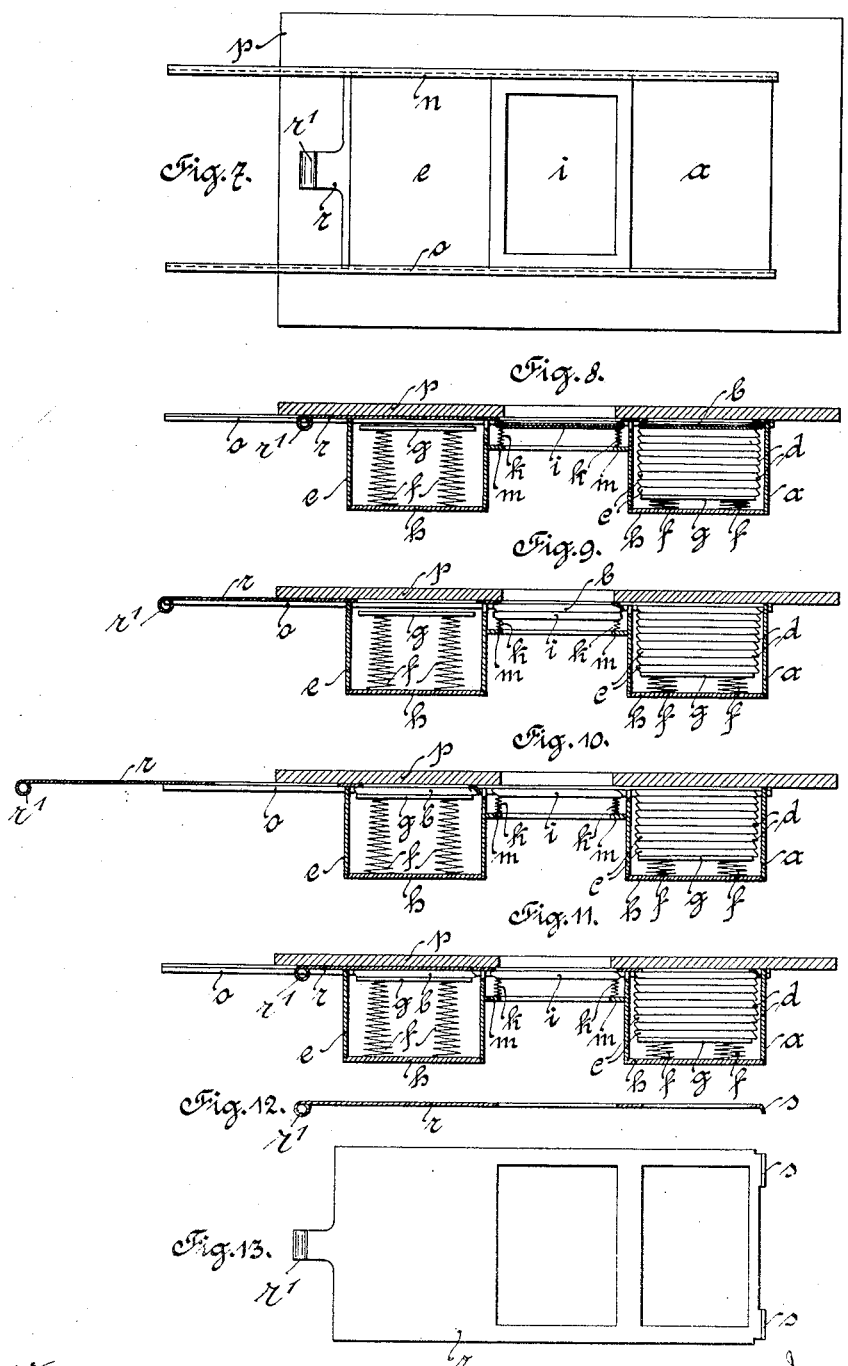

UNITED STATES PATENT OFFICE.

THEODOR BÄNDER, OF FRANKFORT-ON-THE-MAIN, GERMANY.

PHOTOGRAPHIC-PLATE HOLDER.

1,052,029.　　　　Specification of Letters Patent.　　Patented Feb. 4, 1913.

Application filed October 26, 1911. Serial No. 656,959.

*To all whom it may concern:*

Be it known that I, THEODOR BÄNDER, a subject of the German Emperor, and residing at Frankfort-on-the-Main, German Empire, have invented certain new and useful Improvements in Photographic-Plate Holders, of which the following is a specification.

This invention relates to improvements in plate-holders for photographic cameras, and consists in the combination with a sensitive plate magazine, of a translucent screen, and a collecting magazine for the exposed plates, in such manner that the sensitive plates can in succession be brought into the position for exposure mechanically, and after the photograph has been taken, again mechanically deposited in the collecting magazine. In this way a large number of photographs can be taken without any parts having to be changed or the screen disturbed.

Two embodiments of the invention are illustrated in the accompanying drawings.

Figure 1 is a rear view of the one form of construction, and Figs. 2–6 are sectional views showing the parts in successive positions of use. Fig. 7 is a rear view of a modified construction, and Figs. 8–11 are sectional views showing the parts of this modification in successive positions of use, while Fig. 12 is a longitudinal section, and Fig. 13 an elevation of the slide employed in this modification.

Referring more particularly to the apparatus shown in Figs. 1–6, $a$ is the magazine serving to accommodate the sensitized plates $b$, each provided in familiar manner with a carrier or sheath whose sides are turned over at $c$, $d$. The magazine $e$ serves to receive the exposed plates. In each magazine $a$, $e$ there are located coiled springs $f$, with a follower $g$ for pressing forward the plates. The cover $h$ is removable, to admit of insertion and removal of the plates. Between the two magazines there is disposed the ground glass pane $i$, which is rendered resilient by resting against springs $k$, held by pins $m$ on the magazines. The two magazines and the ground glass plate slide between fillets $n$, $o$, secured to the back $p$. To the latter, both above and below, there is fastened a lever or catch $q$, each of which can be turned from its vertical position only in the direction of the ground glass $i$.

The apparatus is employed in the following manner, supposing the charged magazine $a$ to occupy the position shown in Fig. 2, and that a plate is to be exposed, or in other words a photograph taken: The entire magazine device is first moved into the position shown in Fig. 3, the lever $q$ taking behind the plate $b$ which is outermost. Thereupon the device is pushed into the position shown in Fig. 4, the said plate $b$ thus being located in front of the ground glass $i$, which yields owing to the springs $k$. The plate $b$ is now ready for use. When the photograph has been taken, the apparatus must be brought into the position shown in Fig. 5, and since the lever $q$ remains stationary, the plate $b$ is deposited in the collecting magazine $e$. Hereupon the apparatus is returned to the position depicted in Fig. 6, which is the same as that shown in Fig. 2, except that a plate has been transferred from magazine $a$ to magazine $e$.

In the modification shown in Figs. 7–13, the general arrangement is similar to that just described, but the plates are fed forward by means of a slide $r$ (Figs. 12 and 13), which grips each individual plate. This slide has the form of a frame, and is furnished with a finger-piece $r^1$ at one end and with hooked corners or catches $s$, $s$ at the other end. The slide receives guidance from the two fillets $n$, $o$.

In using the apparatus the slide $r$ is drawn by the handle $r^1$ from the position shown in Fig. 8 into that illustrated in Fig. 9. The hooked parts $s$ press back the ground glass $i$, and the sensitized plate is in the position for exposure. After taking the photograph the slide $r$ must be brought into the position depicted in Fig. 10, so that the exposed plate $b$ arrives at the collecting magazine $e$. Finally the slide $r$ is returned to the position drawn in Fig. 11, which is that illustrated in Fig. 8, with the exception that one plate $b$ has been removed from the magazine $a$ and deposited in the collecting magazine.

Having thus described my invention, I claim as new—

1. In combination, two spaced magazines, one for unexposed and the other for exposed plates, and a guide upon which the magazines slide, presenting means which permit unobstructed passage of the unexposed plates on forward motion of the magazines, but which resist retraction of the outer plate on return of the sliding structure.

2. In combination, two spaced magazines, one for unexposed and the other for exposed plates, a translucent screen mounted between the magazines, and a guide upon which the latter slide, presenting means which permit unobstructed passage of the unexposed plates on forward motion of the magazines, but which resist retraction of the outer plate on return of the sliding structure.

3. In combination, two spaced magazines, one for unexposed and the other for exposed plates, a translucent screen resiliently mounted between the magazines, and a guide upon which the latter slide, presenting means which permit unobstructed passage of the unexposed plates on forward motion of the magazines, but which resist retraction of the outer plate on return of the sliding structure.

4. In combination, two spaced magazines, one for unexposed and the other for exposed plates, and a guide upon which the magazines slide, presenting pivotal catches which turn only in the direction of forward motion of the magazines and resist retraction of the outer plate of the first said magazine on return of the sliding structure.

5. In combination, two spaced magazines, one for unexposed and the other for exposed plates, and each provided with spring means for pressing the contained plates outward, a translucent screen resiliently mounted on the contiguous walls of the magazines, and a guide upon which the latter slide, presenting means which permit unobstructed passage of the unexposed plates on forward motion of the magazines, but which resist retraction of the outer plate on return of the sliding structure.

6. In combination, photographic plate holding means comprising two spaced magazines, one for unexposed and one for exposed plates, means for engaging the outer plate of the first said magazine, said holding and engaging means being slidable relatively to each other, and a translucent screen resiliently mounted between the magazines.

In testimony whereof I affix my signature in presence of two witnesses.

THEODOR BÄNDER.

Witnesses:
  ALFONS VAN ROPNER,
  JEAN GRUND.